(12) United States Patent
Tjin (10) Patent No.: US 7,027,672 B2
(45) Date of Patent: Apr. 11, 2006

(54) FIBER OPTIC FORCE SENSOR

(75) Inventor: Swee Chuan Tjin, Singapore (SG)

(73) Assignee: NTU Ventures Private Limited, Singapore (SG)

( * ) Notice: Subject to any disclaimer, the term of this patent is extended or adjusted under 35 U.S.C. 154(b) by 55 days.

(21) Appl. No.: 10/433,737

(22) PCT Filed: Nov. 27, 2001

(86) PCT No.: PCT/SG01/00239

§ 371 (c)(1),
(2), (4) Date: Oct. 16, 2003

(87) PCT Pub. No.: WO02/46712

PCT Pub. Date: Jun. 13, 2002

(65) Prior Publication Data

US 2004/0074307 A1   Apr. 22, 2004

(30) Foreign Application Priority Data

Dec. 7, 2000 (SG) .................... 200007218

(51) Int. Cl.
*G02B 6/00* (2006.01)

(52) U.S. Cl. .................... 385/13; 385/12
(58) Field of Classification Search ............... 385/12, 385/13, 37; 250/227.18, 227.14
See application file for complete search history.

(56) References Cited

U.S. PATENT DOCUMENTS

| | | | |
|---|---|---|---|
| 4,761,073 A | | 8/1988 | Meltz et al. |
| 5,399,854 A | | 3/1995 | Dunphy et al. |
| 5,641,955 A | | 6/1997 | Bonniau et al. |
| 5,680,489 A | * | 10/1997 | Kersey ................ 385/12 |
| 5,781,677 A | * | 7/1998 | Jin et al. ............. 385/37 |
| 5,945,665 A | * | 8/1999 | Hay ................ 250/227.14 |
| 5,973,317 A | * | 10/1999 | Hay ................ 250/227.14 |
| 6,069,985 A | * | 5/2000 | Albin et al. ............. 385/12 |
| 6,233,374 B1 | * | 5/2001 | Ogle et al. ............. 385/13 |
| 6,384,404 B1 | * | 5/2002 | Berg ................ 250/227.16 |
| 6,507,693 B1 | * | 1/2003 | Maron et al. ........... 385/137 |
| 6,600,149 B1 | * | 7/2003 | Schulz et al. .......... 250/227.14 |
| 6,740,866 B1 | * | 5/2004 | Bohnert et al. ......... 250/227.14 |
| 2001/0051019 A1 | * | 12/2001 | Bailey et al. ............. 385/37 |

FOREIGN PATENT DOCUMENTS

GB        002299203 A  *  9/1996

OTHER PUBLICATIONS

Supplementary European Search Report dated Dec. 2, 2004 for related European Patent Application No. 01999793.1-2213-SG0100239.

* cited by examiner

*Primary Examiner*—Kaveh Kianni
*Assistant Examiner*—Charlie Peng
(74) *Attorney, Agent, or Firm*—Foley & Lardner LLP (57) ABSTRACT

A fiber optic force sensor for sensing a force exerted upon an optical fiber and comprising a fiber Bragg grating having a Bragg grating (204) formed in a portion of an optical fiber (203), and a plurality of stacked layers (201, 202) into which the fiber Bragg grating is embedded.

24 Claims, 8 Drawing Sheets

Fig 1a FBG

Fig 1d Transmitted signal ($I_t'$)

Fig 1b Input Signal ($I_{in}$)

Fig 1c Reflected Signal ($I_r'$)

Fig. 6b

FIBER OPTIC FORCE SENSOR

BACKGROUND OF THE INVENTION

FIELD OF THE INVENTION

The invention relates to a fiber optic force sensor for measuring a force exerted upon an optical fiber.

SUMMARY OF THE INVENTION

It is an object of the present invention to provide a device for measuring a force exerted upon an optical fiber in an especially reliable and robust way.

This object is achieved by a device according to any of the independent claims. Advantageous embodiments are defined in the dependent claims.

The present invention provides a force sensor for sensing a force exerted upon an optical fiber, the force sensor comprising:
- a fiber Bragg grating comprising an optical fiber having a fiber optical axis and a Bragg grating being formed in a portion of the optical fiber and having a grating optical axis parallel to the fiber optical axis, wherein the Bragg grating has a predetermined optical transmittance and reflectance, and
- a plurality of stacked layers, wherein at least that portion of the optical fiber comprising the Bragg grating is embedded between a lower layer arrangement comprising at least one lower layer of the plurality of stacked layers and an upper layer arrangement comprising at least one upper layer of the plurality of stacked layers, such that a force exerted upon the optical fiber in a predetermined direction of force results in a variation of the predetermined optical transmittance and reflectance of the Bragg grating.

The optical fiber including the Bragg grating is embedded into a stack formed by the plurality of stacked layers. The force is applied to the optical fiber not directly but via the stack of layers. That is, the force is exerted upon said stack of layers. In consequence, a strain or stress is transmitted to the Bragg grating. Due to said strain or stress, the Bragg grating is deformed. In reaction to this deformation, the optical transmittance and reflectance of the Bragg grating are changed.

Due to the plurality of stacked layers, a damage to the optical fiber during measurement of the force exerted upon the optical fiber is prevented. Consequently, the force sensor of the invention is particularly robust and reliable.

Further, the layers can be selected such that the force sensor has specific predetermined properties such as sensitivity with respect to the force to be measured, range of the force to be measured, and direction of the force to be measured.

Also, temperature effects upon the fiber Bragg grating can be minimized by using thermally insulating materials in the layers.

The invention further provides a force sensor array, comprising
- an optical fiber,
- a plurality of Bragg gratings incorporated into the optical fiber at a corresponding plurality of portions of the optical fiber, wherein the Bragg gratings and the optical fiber each have an optical axis, wherein all of the optical axes are parallel, and wherein each of the Bragg gratings has a predetermined optical transmittance and reflectance, and
- for each Bragg grating, a layer assembly, the layer assembly comprising:
  - a plurality of stacked layers, wherein at least that respective portion of the optical fiber comprising the Bragg grating is embedded between a lower layer arrangement comprising at least one lower layer of the plurality of stacked layers and an upper layer arrangement comprising at least one upper layer of the plurality of stacked layers, such that a force exerted upon the optical fiber results in a variation of the predetermined optical transmittance and reflectance of the Bragg grating.

According to a preferred embodiment of this force sensor array according to the invention, the Bragg wavelength values of the respective Bragg gratings of the plurality of Bragg gratings are set differently. By this arrangement according to the invention, it is not only possible to measure the force exerted upon each of the Bragg gratings, but it is also possible based on the reflected and/or transmitted light to assign the measured force value to the Bragg grating sensing this force and, therefore, to determine the geometrical location of the sensed force along the optical fiber. In this way a device is provided which is capable of mapping a force load along the optical fiber comprising the said Bragg gratings. A practical utilization of such a device is e.g. to measure and monitor the force load of a beam, like a concrete beam in which device is embedded.

BRIEF DESCRIPTION OF THE DRAWINGS

FIG. 1 shows a fiber Bragg grating and its operating principle, wherein

DETAILED DESCRIPTION OF THE PREFERRED EMBODIMENTS OF THE INVENTION

In the following a detailed description of preferred embodiments of the invention will be given, referring to the drawings.

Figure 1A:
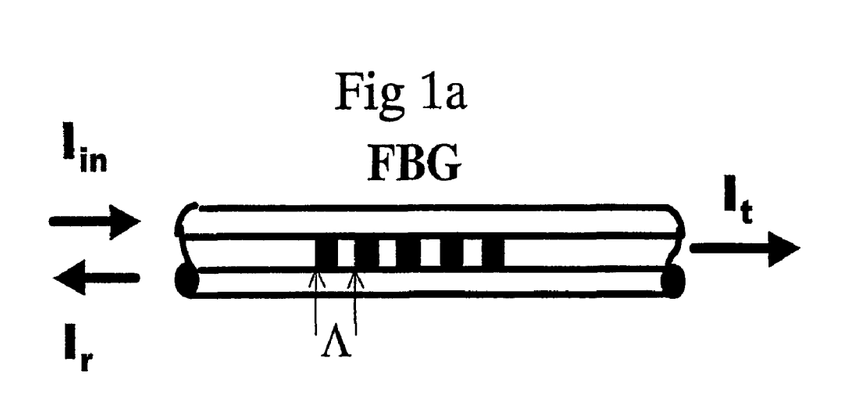
FIG. 1a shows a schematic view of the fiber Bragg grating.
Figure 1B:
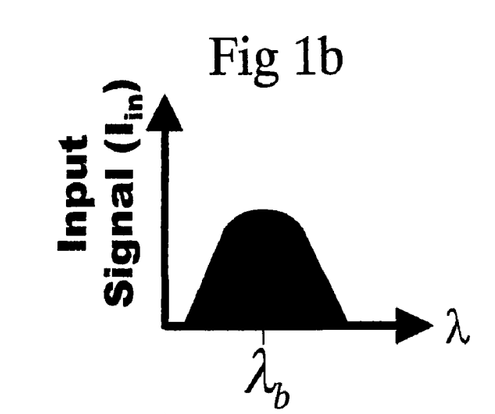
FIG. 1b shows an input signal.
Figure 1C:
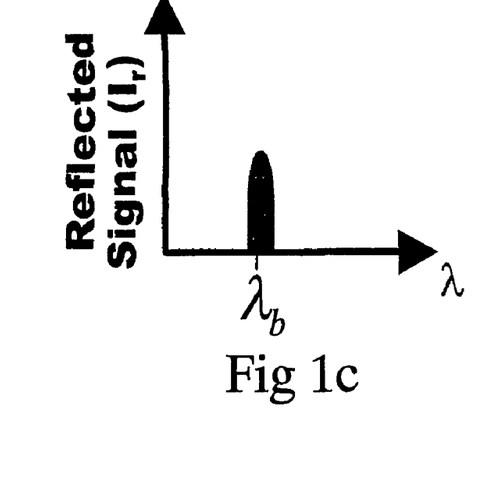
FIG. 1c shows a reflected signal and FIG. 1d shows a transmitted signal of the fiber Bragg grating.
Figure 1D:
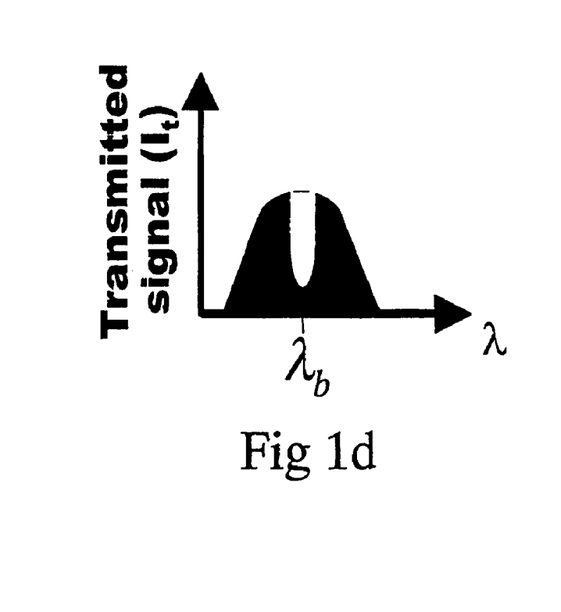

FIG. 1 shows in FIG. 1a a fiber Bragg grating, in FIG. 1b a spectrally resolved input signal $I_{in}$ input into the grating, in FIG. 1c a spectrally resolved reflected signal $I_r$, and in FIG. 1d a spectrally resolved transmitted signal $I_t$ of the fiber Bragg grating. As can be seen from FIGS. 1b–1d, such a fiber Bragg grating is essentially a wavelength-selective filter. A fiber Bragg grating will reflect light that has a wavelength $\lambda_b$ corresponding to twice its period $\Lambda$, multiplied by the effective refractive index of the fiber $n_{eff}$ that the propagating mode sees.

$$\lambda_b = 2\Lambda n_{eff}$$

This is called the Bragg condition, and $\lambda_b$ is called the Bragg wavelength. Light at other wavelengths will be transmitted without significant attenuation. In other words, the grating operates as a narrow-band wavelength notch filter.

Any force or pressure or strain or stress applied to the fiber Bragg grating results in a shift in the Bragg wavelength $\lambda_b$ of the sensor, which can be detected in either the reflected signal or spectrum $I_r$ or in the transmitted signal or spectrum $I_t$. Since the measured information is encoded directly into wavelength, which is in absolute power, the resultant data acquired does not depend directly on the total light intensity, on losses in connectors or on the source power level. For this reason, the force sensor using a fiber Bragg grating is particularly insensitive to exterior deteriorations such as variations in the light intensity or light losses. Therefore, the force sensor according to the present invention is particularly reliable and robust.

In the above Bragg condition, the Bragg wavelength $\lambda_b$ also depends on the temperature of the fiber Bragg grating. Therefore, it is preferred to thermally insulate the fiber Bragg grating from its environment. In the present invention, this can be achieved by using thermally insulating materials in the layers embedding the Bragg grating.

Figure 2:
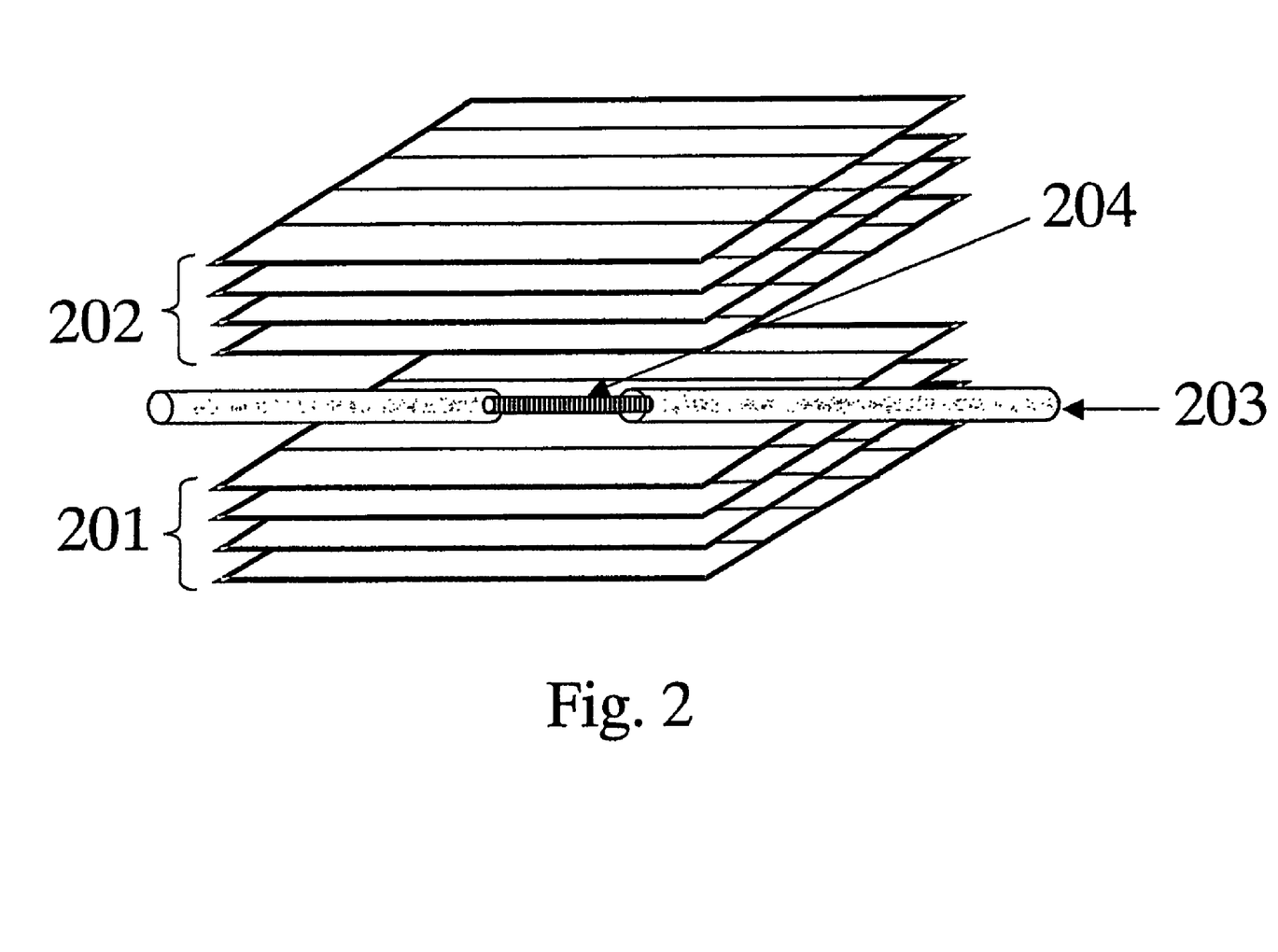
FIG. 2 shows an exploded perspective view of a force sensor designed to operate as a strain sensor, wherein the lower layer arrangement and the upper layer arrangement each comprise the same number of layers, according to an embodiment of the present invention.

FIG. 2 shows an exploded perspective view of a force sensor designed to operate as a strain sensor according to an embodiment of the present invention. The strain sensor comprises an optical fiber 203 comprising a Bragg grating 204 therein, four layers of a lower layer arrangement 201 and four layers of an upper layer arrangement 202. The Bragg grating 204 and the optical fiber 203 form a fiber Bragg grating. The Bragg grating 204 has a grating optical axis parallel to a fiber optical axis of the optical fiber 203.

The Bragg grating 204 is embedded between the lower layer arrangement 201 and the upper layer arrangement 202. The layers of each of the lower layer arrangement 201 and the upper layer arrangement 202 are stacked in parallel.

In this embodiment, the lower layer arrangement 201 and the upper layer arrangement 202 each comprise the same number of layers, i.e. a number of four layers. Such a force sensor having an equal number of layers arranged in the lower layer arrangement 201 and in the upper layer arrangement 202 is also called a strain sensor wherein the fiber Bragg grating is arranged in the neutral layer of the force sensor.

Accordingly, in the embodiment of FIG. 2, the lower layer arrangement 201 and the upper layer arrangement 202 are arranged symmetrically with respect to the Bragg grating 204, so that the Bragg grating 204 is embedded between the lower layer arrangement 201 and the upper layer arrangement 202 symmetrically in the neutral layer. All of the layers are mutually identically formed.

A force exerted upon the optical fiber 203 by pressing upon either the lower layer arrangement 201 or the upper layer arrangement 202 in a direction of force perpendicular to the plan of the layer arrangements does not lead to a significant change of the optical transmittance and reflectance of the Bragg grating, since the fiber Bragg grating is arranged in the neutral layer of the force sensor in this embodiment. I.e. the strain sensor of FIG. 2 having the fiber Bragg grating arranged in the neutral layer of the strain sensor is insensitive to a force applied perpendicular to the fiber optical axis and the plan of the layers of the layer arrangements; such a strain sensor is only sensitive to a force (stress or strain) applied along the fiber axis, or more generally, to a force applied in a direction lying within the plane of the layer arrangement, hence the name "strain" sensor.

Figure 3:
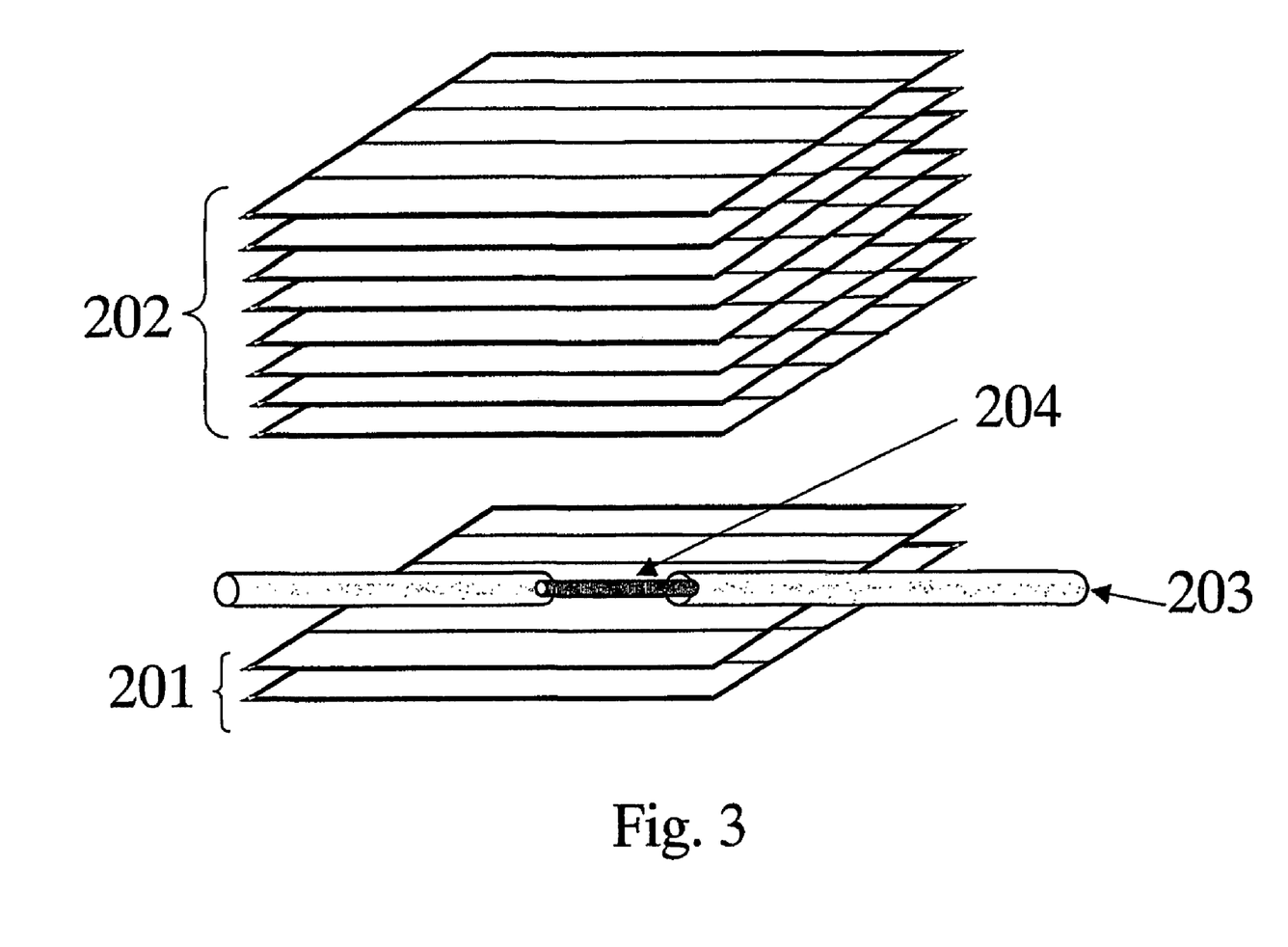
FIG. 3 shows an exploded perspective view of a force sensor designed to operate as a pressure or strain sensor according to the present invention, wherein the lower layer arrangement and the upper layer arrangement each comprise a different number of layers, according to a further embodiment of the present invention.

FIG. 3 shows an exploded perspective view of a force sensor designed to operate as a pressure and strain sensor according to a further embodiment of the present invention. This embodiments is similar to the embodiment shown in FIG. 2, with the exception that the lower layer arrangement 201 and the upper layer arrangement 202 each comprise a different number of layers, i.e. the lower layer arrangement 201 comprises two layers, and the upper layer arrangement 202 comprises eight layers.

Such a force sensor having a different number of layers arranged in the lower layer arrangement 201 and in the upper layer arrangement 202 is also called a pressure sensor wherein the fiber Bragg grating is arranged away from the neutral layer of the force sensor.

In the embodiment shown in FIG. 3, a force exerted upon the optical fiber 203 by pressing upon either the lower layer arrangement 201 or the upper layer arrangement 202 or both of them in a predetermined direction of force leads to a strain in the Bragg grating 204 and in consequence to a deformation of the Bragg grating 204. Therefore, the exerted force results in a variation of the predetermined optical transmittance and reflectance of the Bragg grating 204.

Therefore, a force sensor having the fiber Bragg grating arranged away from the neutral layer can be used in particular to measure a force applied perpendicular to the fiber optical axis and perpendicular to the plane of the layer arrangements and is, therefore, capable to measure a pressure exerted upon either one of the layer arrangements, hence the name "pressure" sensor. This pressure sensor can nevertheless be used also to measure a stress or strain exerted in the plane of the layer arrangement and, in particular in the longitudinal direction of the optical fiber. Accordingly, this sensor can also be used as stain sensor.

Generally speaking, the force sensor having the fiber Bragg grating (FBG) embedded between the lower layer arrangement 201 and the upper layer arrangement 202 according to the invention represents an indirect sensing device.

In comparison to a direct sensing device and method using a bare FBG, the indirect sensing device and technique of the invention using an embedded FBG offers several advantages. First, in case of a pressure sensor according to the invention, when a force is applied to the pressure sensor by means of a plate or similar plane means, it is easier to determine a contact area of the plate with respect to the pressure sensor, i.e. to an uppest or lowest layer. This allows the pressure to be easily estimated. Second, the embedded FBG extends, both in case of a pressure and of a strain sensor according to the invention, the range of forces that can be applied to the FBG with no permanent damage to the FBG. Furthermore, the response of the embedded fiber shows better stability with respect to time as compared to that of the bare FBG used in the direct sensing technique. Such stability is observed when a static force is applied to both the bare and embedded FBGs and the drift in the axial strain is observed over a period of time.

According to the invention, the optical fiber 203 can for example have a diameter which is comparable to a thickness of each layer, although this is not necessary.

The optical fiber 203 can be acrylate-coated, polyimide-coated or uncoated, which is selected according to which materials are contained in the layers. The coating, if such is provided has a thickness of typically 10 μm.

In the embodiments of FIGS. 2 and 3, each layer is made of a composite material comprising a polymer material and elongated carbon fibers being arranged in parallel within each layer. Each layer is thermally and electrically insulating.

In alternative embodiments, each layer can comprise glass fibers instead of or in addition to the carbon fibers.

In further alternative embodiments an epoxy resin material or a polyester resin material is used in the layers.

Preferably, if at least part of the layers are made of a material comprising elongated fibers, the optical fiber 203 has a diameter which is considerably larger than a diameter of the elongated fibers. This provides a smoother bending of the optical fiber 203 embedded between the lower layer arrangement 201 and the upper layer arrangement 202.

Figure 4:
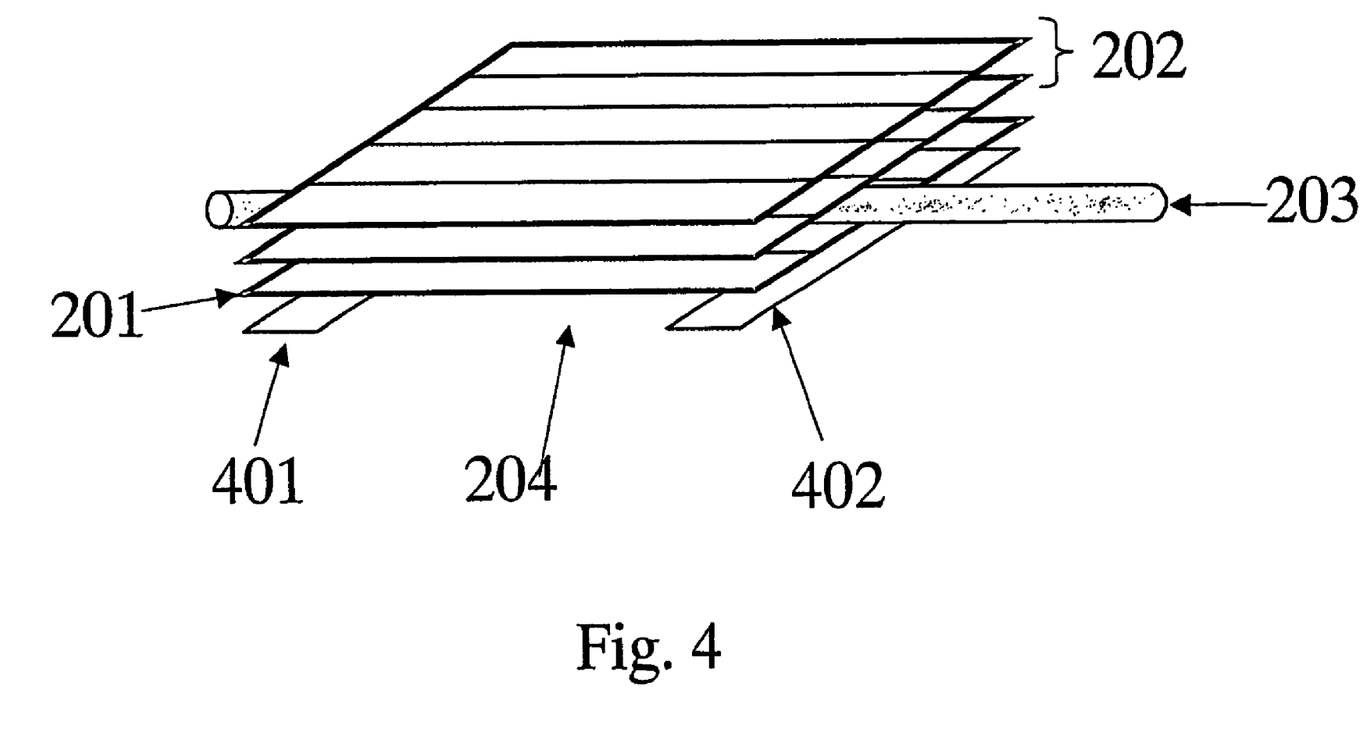
FIG. 4 shows an exploded perspective view of a force sensor, further comprising a first elongated strip attached to a first end of the force sensor, near a first end of the Bragg grating, and a second elongated strip attached to a second end of the force sensor, according to a further embodiment of the present invention.

FIG. 4 shows an exploded perspective view of a force sensor designed to operate as a pressure sensor according to the present invention, further comprising a first elongated strip 401 attached to a first end of the force sensor, near a first end of the Bragg grating 204, and a second elongated strip 402 attached to a second end of the force sensor, according to a further embodiment of the present invention.

The first strip 401 and the second strip 402 are attached on the same side of the pressure sensor. In this embodiment, they are attached at the lower layer arrangement 201. Alternatively, they can be attached at the upper layer arrangement 202.

The first strip 401 and the second strip 402 are arranged parallel to each of the layers and orthogonal to the fiber optical axis of the optical fiber 203.

Each of the first strip 401 and the second strip 402 is made of carbon fiber. In alternative embodiments, the strips 401, 402 are made of a metal, e.g. aluminum, or of some other sufficiently rigid material.

The strips 401, 402 enhance a deformation of the Bragg grating induced by a force or pressure applied to any one of the lower layer arrangement 201 and the upper layer arrangement 202 perpendicular to the layer arrangements. Therefore, the sensitivity of the pressure sensor is further improved by the strips 401, 402.

Figure 5A:
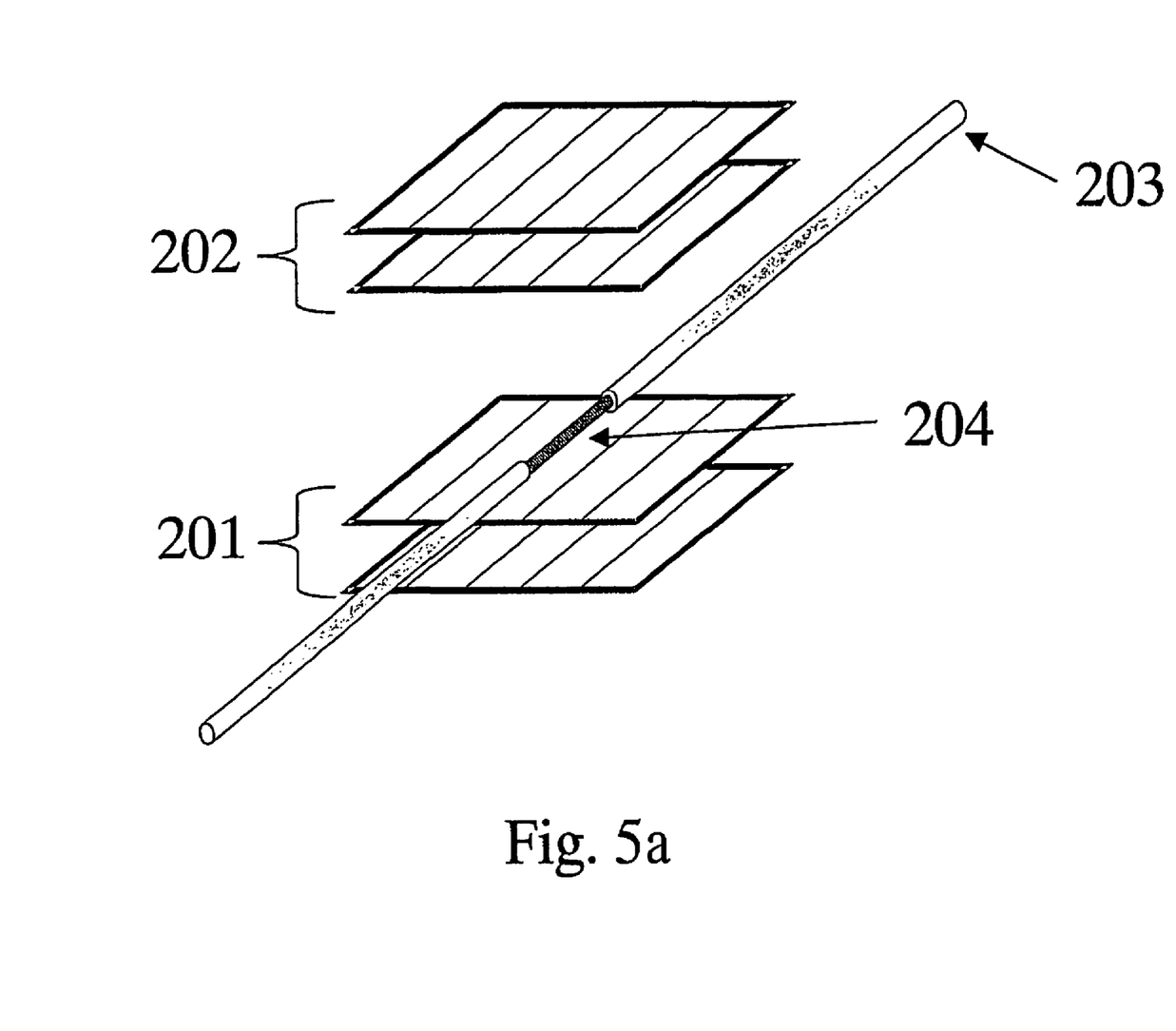
FIG. 5a shows an exploded perspective view of a four uni-ply force sensor designed to operate as a strain sensor, wherein elongated fibers of each two subsequent layers of four layers are aligned mutually parallel, according to a further embodiment of the present invention.

FIG. 5a shows an exploded perspective view of a so-called four uni-ply force sensor according to a further embodiment of the present invention designed to operate as strain sensor. The strain sensor comprises four layers, two layers in the lower layer arrangement 201, and two layers in the upper layer arrangement 202. Each of the layers is made of a material comprising elongated carbon fibers (indicated by straight parallel lines) which are arranged in parallel within each layer. The elongated fibers of each two subsequent layers of the four layers are aligned mutually parallel. That is, the orientation of the elongated fibers is uniform throughout all of the layers. This arrangement is also called a uni-ply arrangement.

Figure 5B:
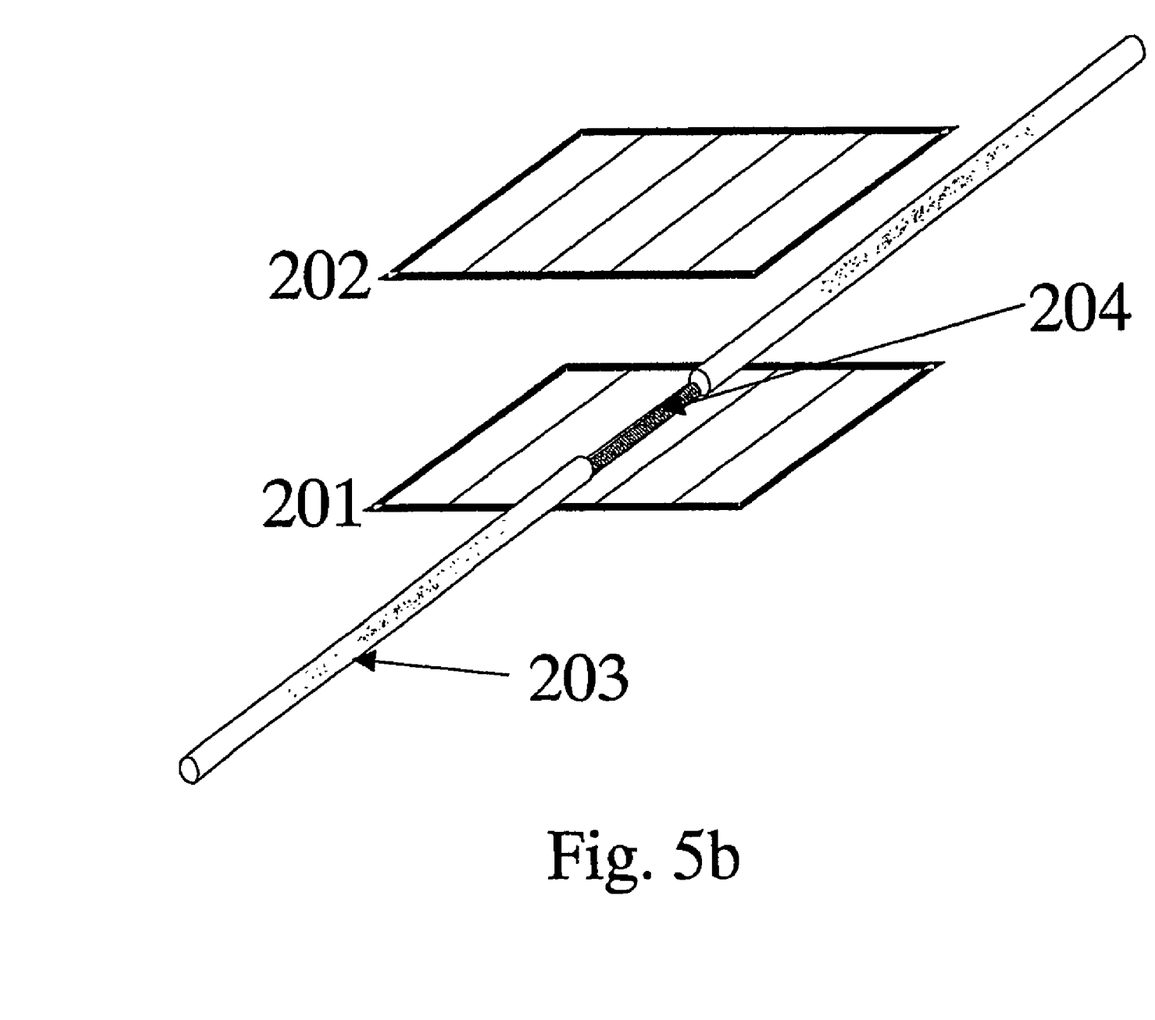
FIG. 5b shows an exploded perspective view of a two uni-ply force sensor designed to operate as a strain sensor, wherein elongated fibers of the two subsequent layers of two layers are aligned mutually parallel, according to a further embodiment of the present invention.

FIG. 5b shows an exploded perspective view of a two uni-ply force sensor according to a further embodiment of the present invention designed to operate as strain sensor. This embodiment is similar to that of FIG. 5b. However the strain sensor of this embodiments comprises only two layers.

Figure 6A:
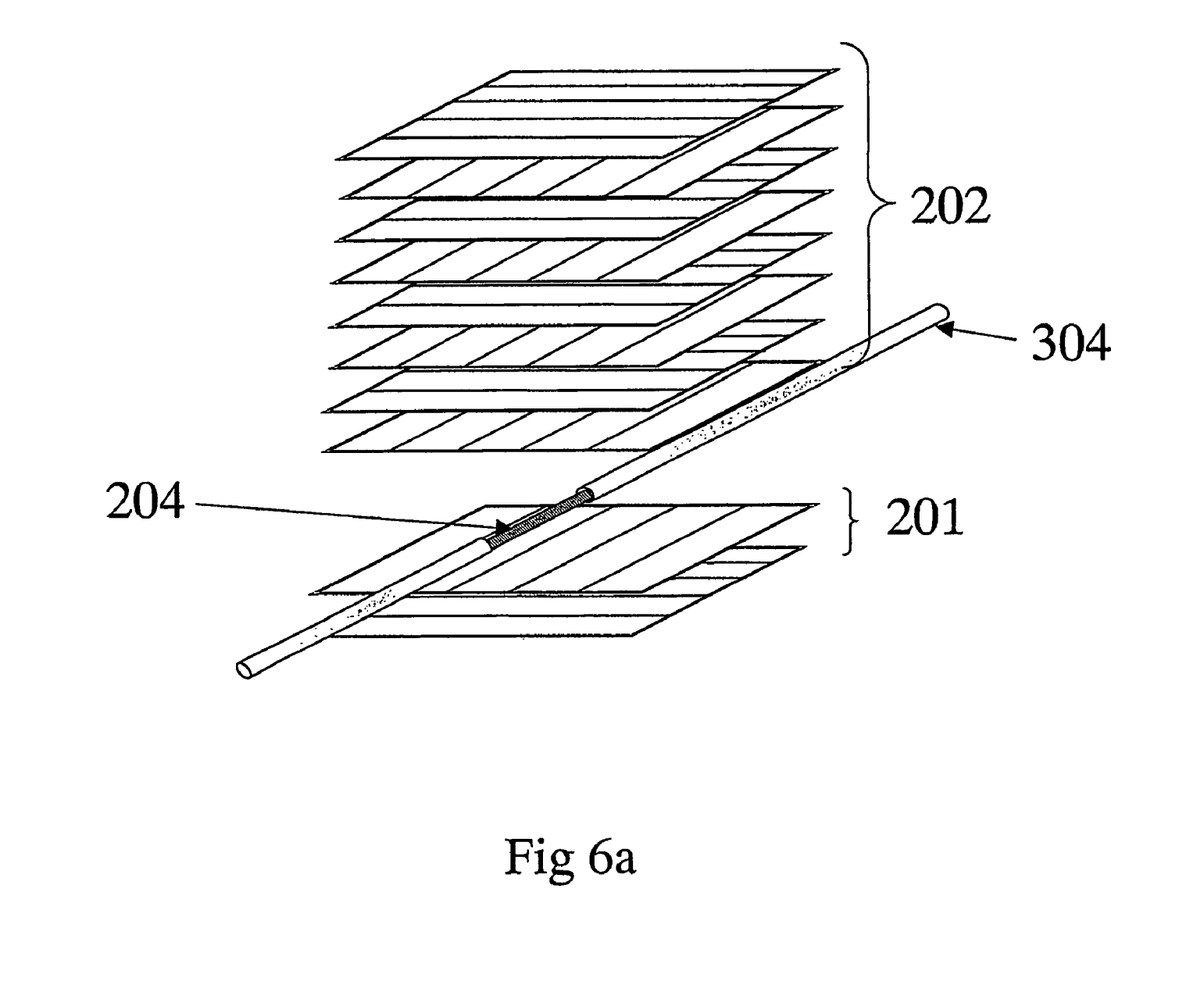
FIG. 6a shows an exploded perspective view of a cross-ply force sensor, wherein elongated fibers of each two subsequent layers of ten layers are aligned mutually orthogonal, according to a further embodiment of the present invention.

FIG. 6a shows an exploded perspective view of a so-called cross-ply force sensor according to a further embodiment of the present invention. In this embodiment, the force sensor comprises ten layers. Two layers are provided in the lower layer arrangement 201, and eight layers are provided in the upper layer arrangement 202. Accordingly, this embodiment of the force sensor is sensitive for forces exerted perpendicular to the plane of the layer arrangement so that this force sensor can operate as pressure sensor. Each layer is made of a carbon fiber reinforced plastic (CFRP) comprising elongated carbon fibers which extend parallel within the layer. The elongated carbon fibers of each two subsequent layers of the ten layers are aligned mutually orthogonal. That is, the orientation of the elongated fibers is alternating by 90 degrees from layer to layer. This arrangement is also called a cross-ply arrangement.

Figure 6B:
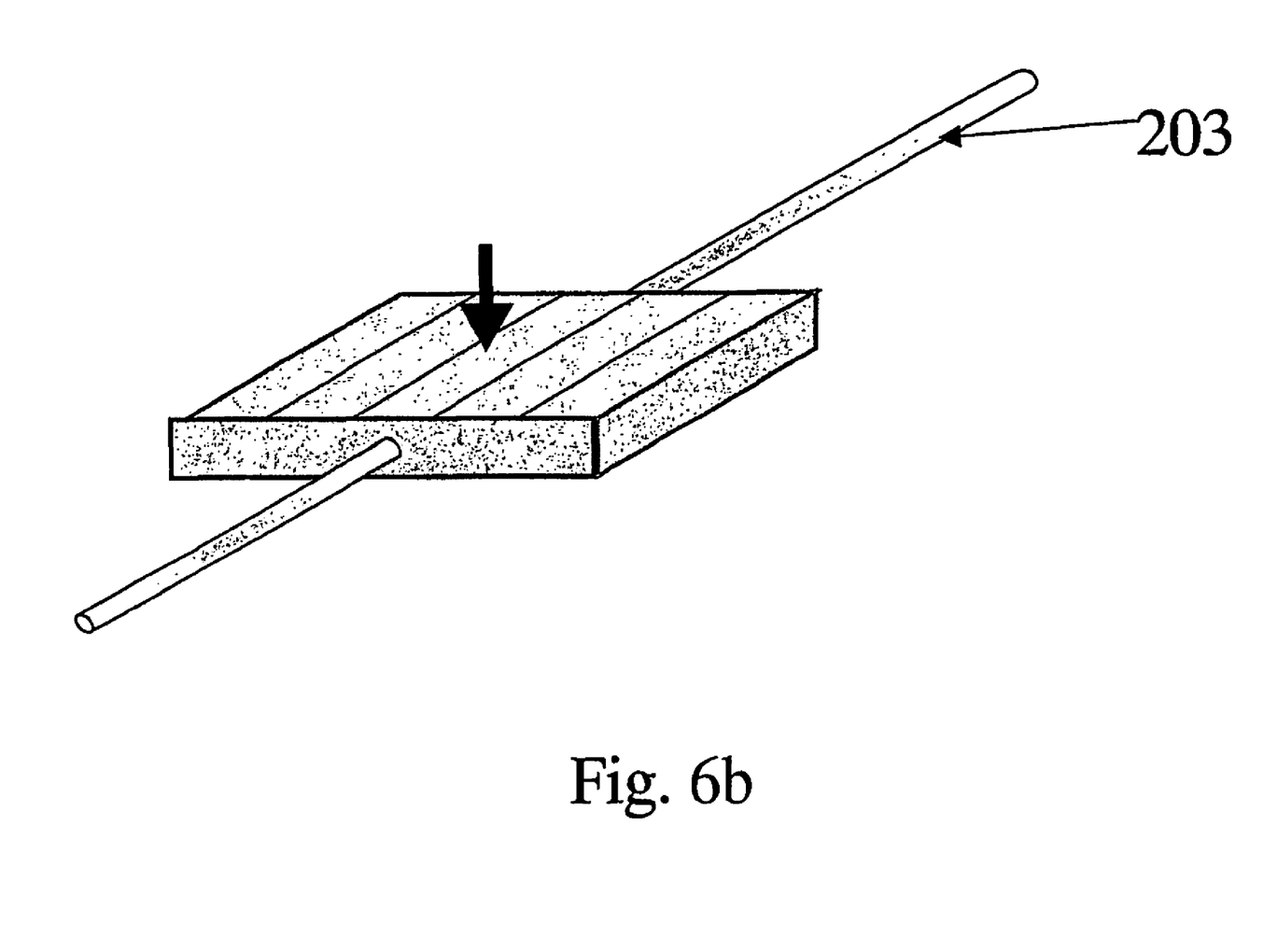
FIG. 6b shows the force sensor of FIG. 6a in an assembled state.

FIG. 6b shows the force sensor of FIG. 6a in an assembled state. The assembled force sensor is very compact and insensitive to damage by exterior influences. Also, the Bragg grating 204 and the portions of the optical fiber 203 surrounding the Bragg grating 204 are protected against damage.

Although the cross-ply force sensor has been described as a pressure sensor having the Bragg grating away from the neutral layer, it can also have its Bragg grating within the neutral layer, in contradistinction to the embodiments of FIGS. 6a and 6b, thereby operating as strain sensor. On the other hand, a uni-ply force sensor can also have its Bragg grating away from the neutral layer, in contradistinction to the embodiments of FIGS. 5a and 5b, thereby operating as a pressure sensor capable to sense both pressure and strain.

The force sensor according to the invention can have an outer shape which is adapted to a means which is used for applying a force to the force sensor. For example, if a front surface of a plane circular disk is used to apply a force to the force sensor designed as pressure sensor, the force sensor can have a plane surface which is suited to contact the entire front surface of the disk.

LEGENDS OF REFERENCE SIGNS

FIG. 2
201 lower layer arrangement
202 upper layer arrangement
203 optical fiber
204 Bragg grating
FIG. 4
401 first elongated strip
402 second elongated strip

What is claimed is:

1. A fiber optic force sensor for sensing a force exerted upon an optical fiber, comprising:
   a fiber Bragg grating comprising
      an optical fiber having a fiber optical axis and
      a Bragg grating being formed in a portion of the optical fiber and having a grating optical axis parallel to the fiber optical axis, wherein the Bragg grating has a predetermined optical transmittance and reflectance, and
a plurality of stacked layers,
wherein at least that portion of the optical fiber comprising the Bragg grating is embedded between a lower layer arrangement comprising at least one lower layer of the plurality of stacked layers and an upper layer arrangement comprising at least one upper layer of the plurality of stacked layers, such that a force exerted upon the optical fiber in a predetermined direction of force results in a variation of the predetermined optical transmittance and reflectance of the Bragg grating,
wherein each layer is made of a composite material comprising a plurality of elongated fibers being arranged in parallel within each respective layer.

2. The force sensor according to claim 1, wherein the thickness of at least one out of the plurality of stacked layers is selected such that the force sensor has a predetermined sensitivity regarding the exerted force.

3. The force sensor according to claim 1, wherein the number of the plurality of stacked layers is selected such that the force sensor has a predetermined sensitivity and range regarding the exerted force.

4. The force sensor according to claim 1, wherein the lower layer arrangement and the upper layer arrangement each comprise the same number of layers.

5. The force sensor according to claim 4, wherein the lower layer arrangement and the upper layer arrangement are arranged symmetrically with respect to the Bragg grating, so that the Bragg grating is embedded between the lower layer arrangement and the upper layer arrangement symmetrically and such that the predetermined optical transmittance and reflectance of the Bragg grating are not influenced by a force exerted upon the optical fiber in a direction of force perpendicular to the plane of the layer arrangements.

6. The force sensor according to claim 1, wherein the lower layer arrangement and the upper layer arrangement each comprise a different number of layers.

7. The force sensor according to claim 1, wherein at least one of the layers comprises a polymer.

8. The force sensor according to claim 1, wherein at least one of the layers comprises an electrically insulating material.

9. The force sensor according to claim 1, wherein at least one of the layers comprises a thermally insulating material.

10. The force sensor according to claim 1, wherein at least one of the layers comprises an epoxy resin material or a polyester resin material.

11. The force sensor according to claim 1, wherein all of the layers are mutually identically formed.

12. The force sensor according to claim 1, wherein, for at least one layer of the lower layer arrangement and for at least one layer of the upper layer arrangement, the elongated fibers of the different layers are aligned mutually parallel and parallel with respect to the fiber optical axis.

13. The force sensor according to claim 12, wherein for two layers adjacent to the Bragg grating the elongated fibers of the two different layers are aligned mutually parallel and parallel with respect to the fiber optical axis.

14. The force sensor according to claim 1, wherein the elongated fibers of each two subsequent layers are aligned mutually parallel.

15. The force sensor according to claim 1, wherein the elongated fibers of each two subsequent layers are aligned mutually orthogonal.

16. The force sensor according to claim 1, wherein at least part of the elongated fibers are carbon fibers.

17. The force sensor according to claim 1, wherein at least part of the elongated fibers are glass fibers.

18. The force sensor according to claim 1, further comprising a first elongated strip attached to a first end of the force sensor, near a first end of the Bragg grating, and a second elongated strip attached to a second end of the force sensor, near a second end of the Bragg grating, so as to increase the sensitivity of the force sensor.

19. The force sensor according to claim 18, wherein the first strip and the second strip are attached on the same side of the force sensor, either at the lower layer arrangement or at the upper layer arrangement.

20. The force sensor according to claim 18, wherein the first strip and the second strip are arranged parallel to at least one of the layers and orthogonal to the fiber optical axis.

21. The force sensor according to claim 1, wherein the direction of force extends parallel to the fiber optical axis of the optical fiber.

22. The force sensor according to claim 1, wherein the direction of force extends perpendicular to the fiber optical axis of the optical fiber.

23. A fiber optic force sensor for sensing a force exerted upon an optical fiber, comprising:
a fiber Bragg grating comprising:
an optical fiber having a fiber optical axis; and
a Bragg grating being formed in a portion of the optical fiber and having a grating optical axis parallel to the fiber optical axis,
wherein the Bragg grating has a predetermined optical transmittance and reflectance; and
a plurality of stacked layers,
wherein at least tat portion of the optical fiber comprising the Bragg grating is embedded between a lower layer arrangement comprising at least one lower layer of the plurality of stacked layers and an upper layer arrangement comprising at least one upper layer of the plurality of stacked layers, such that a force exerted upon the optical fiber in a predetermined direction of force results in a variation of the predetermined optical transmittance and reflectance of the Bragg grating,
wherein at least one of the layers comprises an epoxy resin material or a polyester resin material.

24. A fiber optic force sensor for sensing a force exerted upon an optical fiber, comprising:
a fiber Bragg grating comprising:
an optical fiber having a fiber optical axis; and
a Bragg grating being formed in a portion of the optical fiber and having a grating optical axis parallel to the fiber optical axis,
wherein the Bragg grating has a predetermined optical transmittance and reflectance; and
a plurality of stacked layers,
wherein at least that portion of the optical fiber comprising the Bragg grating is embedded between a lower layer arrangement comprising at least one lower layer of the plurality of stacked layers and an upper layer arrangement comprising at least one upper layer of the plurality of stacked layers, such that a force exerted upon the optical fiber in a predetermined direction of force results in a variation of the predetermined optical transmittance and reflectance of the Bragg grating, wherein all of the layers are mutually identically formed.

* * * * *

UNITED STATES PATENT AND TRADEMARK OFFICE
CERTIFICATE OF CORRECTION

PATENT NO. : 7,027,672 B2 Page 1 of 1
APPLICATION NO. : 10/433737
DATED : April 11, 2006
INVENTOR(S) : Swee Chuan Tjin

It is certified that error appears in the above-identified patent and that said Letters Patent is hereby corrected as shown below:

In the claims:

Claim 23, Column 8, Line 44, replace "tat" with --that--

Signed and Sealed this

Twenty-second Day of August, 2006

JON W. DUDAS
*Director of the United States Patent and Trademark Office*